US012693637B2

(12) United States Patent (10) Patent No.: US 12,693,637 B2

Aso et al. (45) Date of Patent: Jul. 28, 2026

(54) METHOD FOR GENERATING NEURAL NETWORK MODEL AND CONTROL DEVICE USING NEURAL NETWORK MODEL

(71) Applicant: TRANSTRON INC., Yokohama (JP)

(72) Inventors: Noriyasu Aso, Yokohama (JP); Masatoshi Ogawa, Yokohama (JP)

(73) Assignee: TRANSTRON INC., Yokohama (JP)

( * ) Notice: Subject to any disclaimer, the term of this patent is extended or adjusted under 35 U.S.C. 154(b) by 1226 days.

(21) Appl. No.: 17/461,098

(22) Filed: Aug. 30, 2021

(65) Prior Publication Data

US 2021/0390412 A1 Dec. 16, 2021

Related U.S. Application Data

(63) Continuation of application No. PCT/JP2019/008339, filed on Mar. 4, 2019.

(51) Int. Cl.
| | |
|---|---|
| *G05B 13/02* | (2006.01) |
| *G06F 18/21* | (2023.01) |
| *G06F 18/213* | (2023.01) |
| *G06N 3/08* | (2023.01) |

(52) U.S. Cl.
CPC ......... *G05B 13/027* (2013.01); *G06F 18/213* (2023.01); *G06F 18/217* (2023.01); *G06N 3/08* (2013.01)

(58) Field of Classification Search
CPC ... G05B 13/027; G06F 18/213; G06F 18/217; G06N 3/044; G06N 3/08; G06N 3/0442; G06N 3/09
See application file for complete search history.

(56) References Cited

U.S. PATENT DOCUMENTS

| | | | |
|---|---|---|---|
| 2005/0261889 A1 | 11/2005 | Iwakura | |
| 2016/0217379 A1* | 7/2016 | Patri | G05B 13/0265 |
| 2017/0091615 A1 | 3/2017 | Liu et al. | |
| 2018/0046926 A1* | 2/2018 | Achin | G06F 9/5011 |
| 2018/0293495 A1 | 10/2018 | Okumura et al. | |

(Continued)

FOREIGN PATENT DOCUMENTS

| | | |
|---|---|---|
| JP | 6-274207 A | 9/1994 |
| JP | H10-176578 | 6/1998 |

(Continued)

OTHER PUBLICATIONS

Eltoft, "Data Augmentation Using a Combination of Independent Component Analysis and Non-Linear Time-Series Prediction", Aug. 7, 2002, Proceedings of the 2002 International Joint Conference on Neural Networks. IJCNN'02 , pp. 448-453. (Year: 2002).*

(Continued)

*Primary Examiner* — Brent Johnston Hoover
(74) *Attorney, Agent, or Firm* — STAAS & HALSEY LLP

(57) ABSTRACT

A method for generating a neural network model, the method includes acquiring first time series data having a first period that is shorter than an operation period of the neural network model; extracting, from the first time series data, a plurality of sets of second time series data having a second period that is longer than the first period; and executing training on the neural network model using training data that include the plurality of sets of second time series data.

9 Claims, 17 Drawing Sheets

(56) References Cited

U.S. PATENT DOCUMENTS

| | | | | |
|---|---|---|---|---|
| 2019/0236447 | A1* | 8/2019 | Cohen | ..................... G06N 3/092 |
| 2020/0034745 | A1* | 1/2020 | Nagpal | .................. G06N 5/022 |
| 2020/0065324 | A1 | 2/2020 | Watanabe et al. | |
| 2021/0089962 | A1 | 3/2021 | Sato et al. | |

FOREIGN PATENT DOCUMENTS

| | | |
|---|---|---|
| JP | 2006-4399 A | 1/2006 |
| JP | 2010-95067 A | 4/2010 |
| JP | 2018-142160 A | 9/2018 |
| WO | 2019/026193 A1 | 2/2019 |

OTHER PUBLICATIONS

Arsie et al., "Recurrent Neural Networks for Air-Fuel Ratio Estimation and Control in Spark-Ignited Engines", Jul. 11, 2008, Proceedings of the 17th World Congress the International Federation of Automatic Control, pp. 8508-8513 (Year: 2008).*

English Translation of International Search Report dated Apr. 23, 2019 from International Application No. PCT/JP2019/008339.

Written Opinion of International Searching Authority dated Apr. 23, 2019 from International Application No. PCT/JP2019/008339.

Um, Terry et al. "Data Augmentation of Wearable Sensor Data for Parkinson's Disease Monitoring using Convolutional Neural Networks", Proceedings of the 19th ACM International Conference on Multimodal Interaction, Nov. 13, 2017, pp. 216-220.

Arsie et al., "Recurrent Neural Networks for Air-Fuel Ratio Estimation and Control in Spark-Ignited Engines", 5th IFAC Symposium on Modelling and Control in Biomedical Systems 2003, Melbourne, Australia, Aug. 21-23, 2003, vol. 41, No. 2, Jan. 1, 2008, pp. 8508-8513.

Extended European Search Report dated Feb. 18, 2022 from European Application No. 19917869.0.

European Office Action dated Jul. 24, 2024 for European patent application No. 19 917 869.0.

European Office Action dated Nov. 5, 2025 in corresponding European patent application No. 19917869.0.

* cited by examiner

FIG. 3

ACQUIRED TIME SERIES DATA data01

PLURALITY OF SETS OF TIME SERIES DATA HAVING SAME PERIOD, EXTRACTED AT DIFFERENT PHASES

EXTRACTED TIME SERIES DATA data01_1~data01_3

EXAMPLE OF CROSS-VALIDATION

COMPARATIVE EXAMPLE

FITNESS : 71.8%

RMSE = 0.106

$R^2 = 0.921$

EXAMPLE OF EMBODIMENT

FITNESS : 85.7%

RMSE = 0.054

$R^2 = 0.980$

PRECISION IS FAVORABLE WHEN PLOTS ARE ON y = x

METHOD FOR GENERATING NEURAL NETWORK MODEL AND CONTROL DEVICE USING NEURAL NETWORK MODEL

CROSS-REFERENCE TO RELATED APPLICATION

This application is a continuation application of International Application Number PCT/JP2019/008339 filed on Mar. 4, 2019 and designated the U.S., the entire contents of which are incorporated herein by reference.

FIELD

The present invention relates to a method for generating a neural network model and a control device that uses a neural network model.

BACKGROUND

For instance, an engine control device or the like is a control device that uses a neural network model. A plant model and soft sensors, e.g., a pressure gauge and a thermometer, are provided in the control device in order to estimate transient operating conditions of the engine, and the plant model and soft sensors are constituted by the neural network model.

For instance, a neural network model for estimating transient operating states of an engine uses manipulating variables of various actuators, e.g., an engine rotation speed and a fuel injection amount, as input, and outputs a torque as a controlled variable. The neural network model is then trained using training data including the aforementioned manipulating variables and the torque, for instance, whereupon parameters, e.g., the weights and biases of the neural network, are adjusted. This training process needs a great amount of training data.

Generally, in a neural network that performs image classification or the like, when gathering the training data needed for training, the amount of data is expanded by several multiples or several tens of multiples by performing image processing, e.g., rotating or reversing acquired images.

CITATION LIST

Patent Literature

Patent Literature 1: Japanese Patent Application Publication No. H6-274207
Patent Literature 2: Japanese Patent Application Publication No. 2018-142160

However, in the case of a neural network model for estimating transient operating states of an engine, as described above, manipulating variables of actuators are used as input, and a torque that is a controlled variable is output. The manipulating variables and the torque needed as the training data are time series data that vary over time. Therefore, a data expansion method involving rotating and reversing images, e.g., a method used during image classification, is not able to be employed.

SUMMARY

An embodiment of the present invention is a method for generating a neural network model, the method comprising:

acquiring first time series data having a first period that is shorter than an operation period of the neural network model; extracting, from the first time series data, a plurality of sets of second time series data having a second period that is longer than the first period; and executing training on the neural network model using training data that include the plurality of sets of second time series data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a view illustrating a configuration of an NN model generation device for generating an NN model according to this embodiment.

FIG. 13 is a view illustrating an example in which noise is generated in time series data acquired from a real engine or the like.

DESCRIPTION OF EMBODIMENTS

Example of Time Series Data

Figure 1:
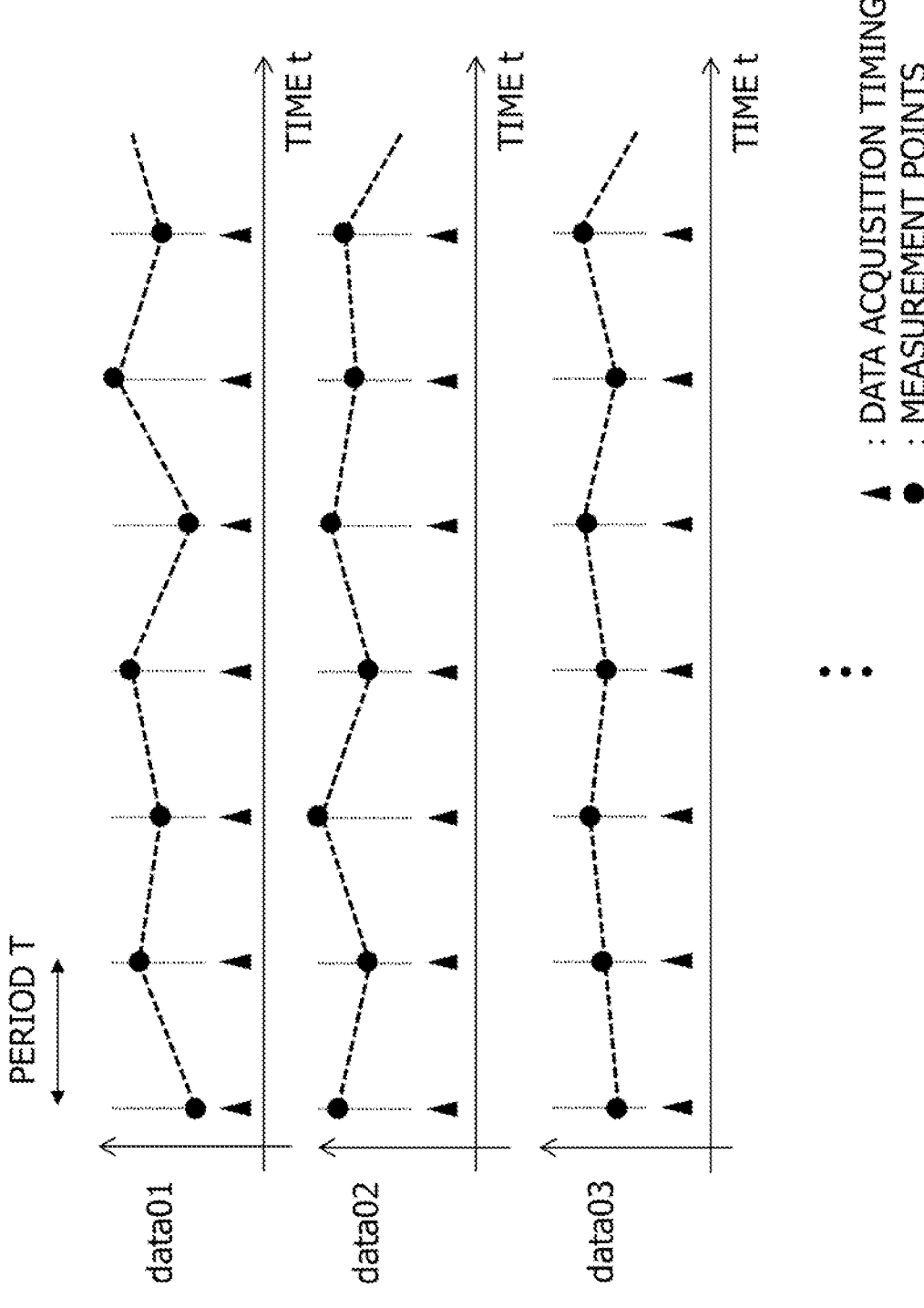
FIG. 1 is a view illustrating an example of time series data.

FIG. 1 is a view illustrating an example of time series data. This example illustrates, for instance, the time series data of a manipulating variable that is the input, or a controlled variable that is the output of a neural network model (referred to as an NN model hereafter (NN being an abbreviation for Neural Network)) used to estimate transient operating states of an engine. FIG. 1 depicts three sets of time series data data01 to data03.

The time series data data01 to data03 include manipulating variables and controlled variables acquired at each data acquisition timing on a time axis. The data acquisition timings are timings at which an operation period, or more specifically a calculation period, of the NN model is repeated, and are represented by triangles in FIG. 1. The axis of ordinate indicates amount of manipulating variables or controlled variables.

The time series data are acquired from an actual engine by operating the engine on an engine bench, for instance. In other words, the time series data are acquired from the engine by operating the engine in an operation mode of a test model of the Ministry of Transport or an international test model. Further, the internal condition of the engine and the environmental conditions (outside air temperature, outside air pressure, and so on) may be acquired as time series data simultaneously.

A great amount of training data is needed to generate a neural network model by training. As noted above, however, acquiring time series data, e.g., a manipulating variable and a controlled variable, by operating an actual engine involves a great number of processes, meaning that there is a fixed limit on the amount of training data that are able to be acquired.

In an NN model that performs image classification, images to be used as training data are able to be easily subjected to data expansion by rotating and reversing acquired images. In contrast to images, however, it is not possible to rotate or reverse time series data.

Figure 2:
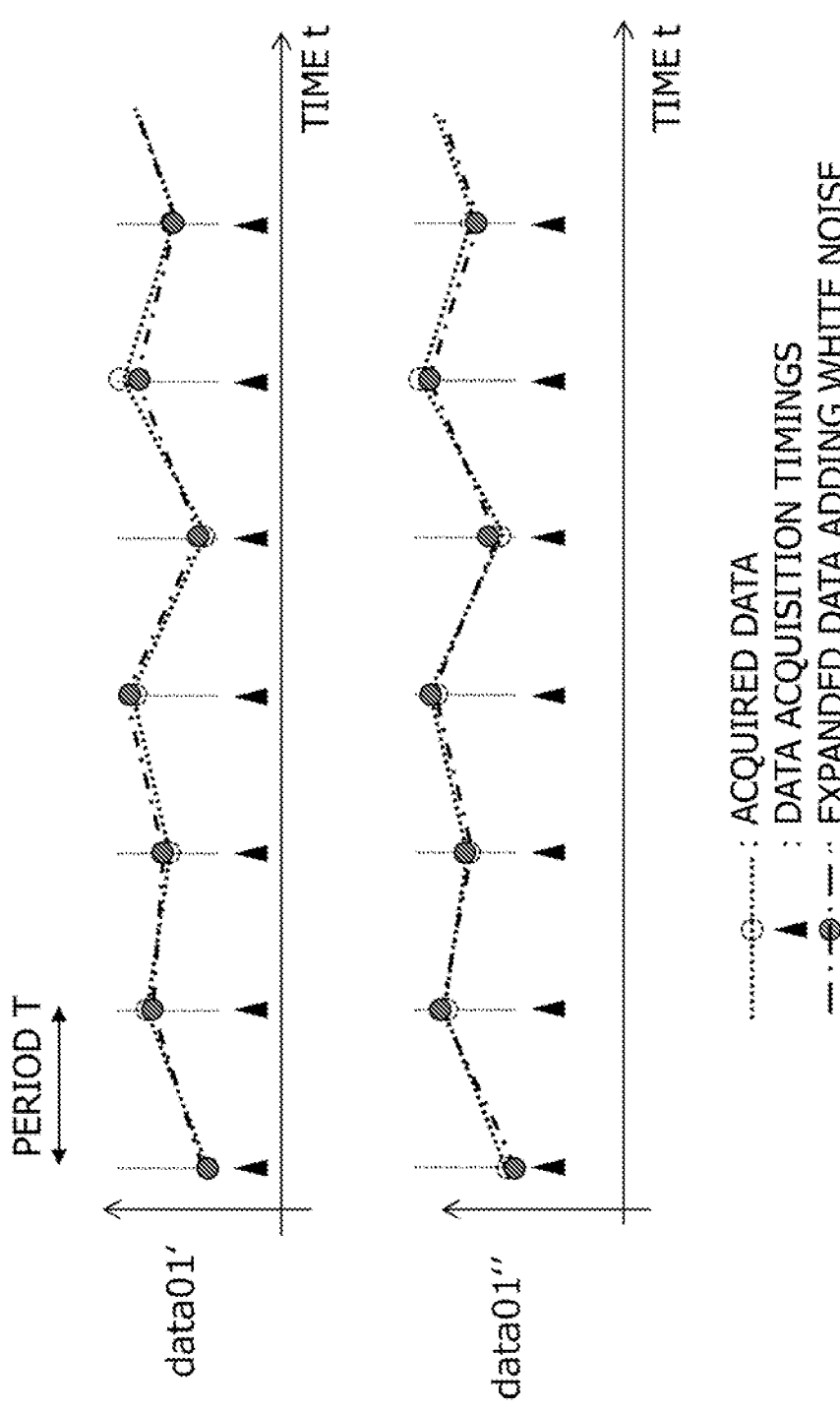
FIG. 2 is a view illustrating an example of expanded time series data acquired by adding white noise to time series data.

FIG. 2 is a view illustrating an example of expanded time series data acquired by adding white noise to time series data. The white noise is added to measurement values measured at respective timings of the time series data data01 of FIG. 1, which were acquired from a real engine, to generate new time series data data01' and data01". In this case, data expansion is able to be performed comparatively easily.

However, the expanded time series data data01' and data01" are generated by simply adding a very low amount of noise to the measurement values of the acquired time series data data01, and therefore the expanded time series data data01' and data01" exhibit an identical tendency to the acquired time series data data01. Hence, when the NN model is trained using the expanded time series data data01' and data01" as training data, a bias may occur in the NN model based on the identical tendency exhibited by the plurality of sets of training data. Moreover, when the magnitude of the noise added to the measurement values of the acquired time series data is great, the precision of the trained NN model may decrease, and therefore setting the magnitude of the noise is not easy.

Embodiment

Figure 3:
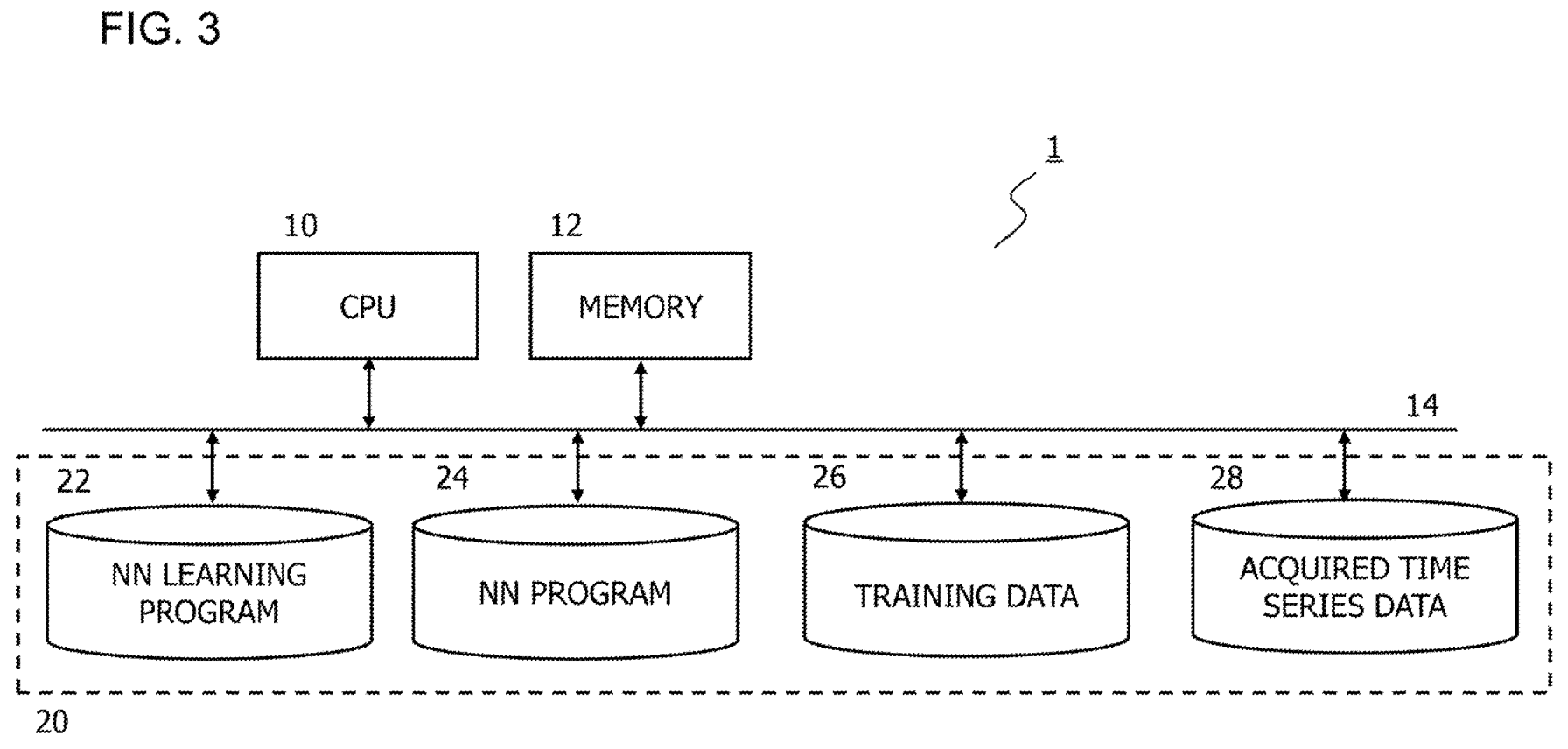

FIG. 3 is a view illustrating a configuration of an NN model generation device for generating an NN model according to this embodiment. An NN model generation device 1 is an information processing device, e.g., a high-performance computer, a server, or a personal computer. The NN model generation device 1 includes a CPU 10 that is a processor, a main memory 12 accessed by the processor, and a large capacity auxiliary storage device 20. The auxiliary storage device 20 is a hard disk drive or a solid-state drive, for instance.

The auxiliary storage device 20 stores an NN training program 22 for causing the processor to execute training processing on the NN model, an NN program 24 for causing the processor 10 to execute arithmetic operations or calculations in the NN model, training data 26 used to train the NN model, acquired time series data 28 acquired from an actual engine or the like, and so on.

The processor 10 executes NN model training by executing the NN training program 22 and the NN program 24 using the training data 26, to adjust NN model parameters, e.g., weights and biases, and thereby generates an NN model. Further, the processor 10 performs data expansion on the acquired time series data 28 by executing the NN training program 22, thereby increasing the amount of time series data included in the training data 26 used to train the NN model.

Figure 4:
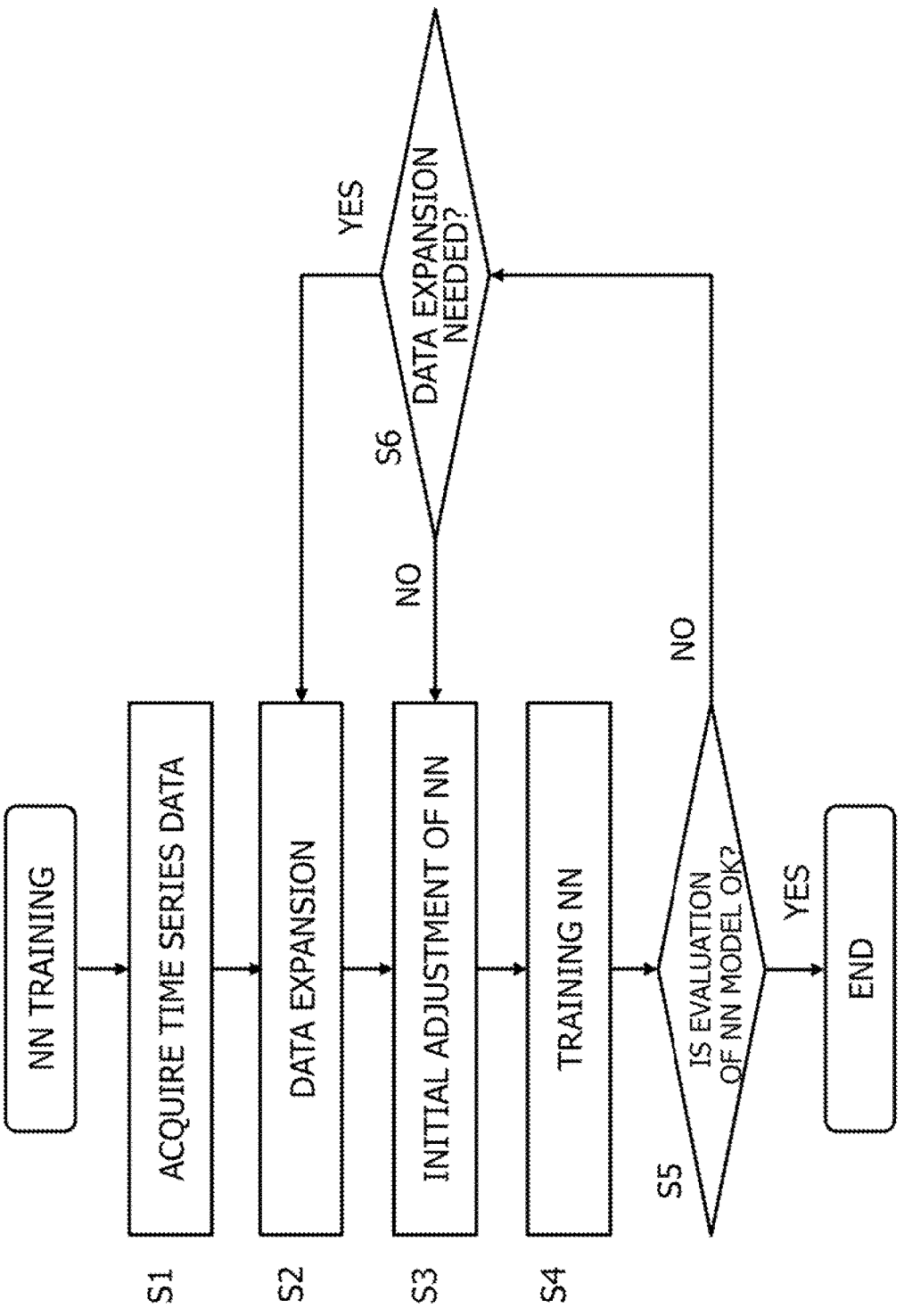
FIG. 4 is a view illustrating a flowchart of an NN model training method according to this embodiment.

FIG. 4 is a view illustrating a flowchart of an NN model training method according to this embodiment. The processor 10 executes the NN training program 22 in order to acquire time series data from the acquired time series data 28 stored in the auxiliary storage device 20 (S1). The processor 10 then generates a plurality of time series data from the acquired time series data by performing data expansion, to be described below (S2). The processor stores training data including the time series data generated by data expansion in the auxiliary storage device 20, thereby increasing the amount of training data. At this point, preparation of the training data to be used subsequently to train the NN model is complete.

Next, the processor 10 executes initial adjustment of the NN model (S3). In this initial adjustment, for instance, the processor performs initial adjustments of hyperparameters, e.g., the number of neurons on each layer and training functions of the NN model.

The processor then executes training of the NN model by executing the NN training program 22 and the NN program 24 using a predetermined amount of training data (S4).

Figure 5:
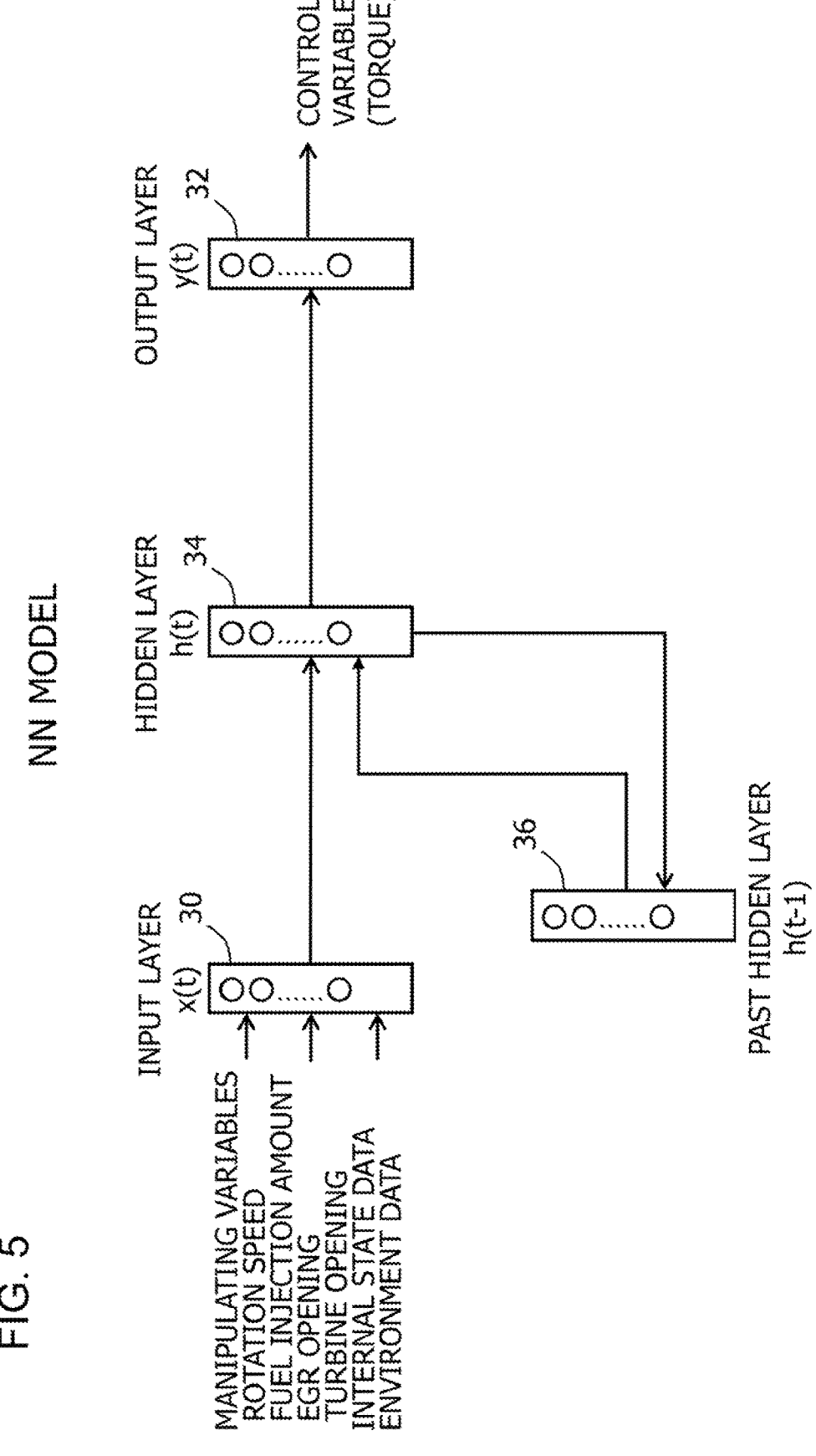
FIG. 5 is a view illustrating an example of a virtual configuration of an NN model.

FIG. 5 is a view illustrating an example of a virtual configuration of an NN model. In this NN model, one or a plurality of hidden layers 34 are provided between an input layer 30 and an output layer 32. The NN model also includes a past hidden layer 36 having a type of memory function for temporarily storing the values in the hidden layers 34. An NN model that input time series data, e.g., an NN model of an engine, is preferably a recurrent neural network that includes this type of past hidden layer 36 having a memory function.

Taking an NN model of an engine as an example, the NN model training processing is as follows. First, manipulating variables (for instance, the engine rotation speed, the fuel injection amount, the EGR opening (the opening of an EGR valve (EGR: exhaust gas recirculation)), and the turbine opening) are input into the input layer 30 together with data indicating the internal state of the engine, environment data, and so on. The manipulating variables are time series data in each operation period (arithmetic operation period or calculation period) of the NN model.

The processor executes arithmetic operations of each layer of the NN model on the input data input into the input layer 30 in a forward direction, and outputs a controlled variable, for instance a torque, in time series to the output layer 32 as output data. Next, the processor calculates an error based on a difference between the controlled variable output to the output layer 32 and a controlled variable corresponding to the manipulating variables input of the training data. Further, the processor calculates the error on each layer by back-propagating the calculated error in the reverse direction of the NN (toward the input layer). The processor then adjusts parameters, e.g., the weight and bias of each layer, so as to reduce the error calculated on each layer.

The processor executes the forward-direction arithmetic operation, the reverse-direction arithmetic operation, and the parameter adjustment described above on all of the training data. At this point, the processor completes minibatch training. The processor typically repeats the minibatch training a plurality of times.

Returning to FIG. 4, after executing the minibatch training a plurality of times (S4), for instance, the processor executes an evaluation on the NN model (S5). During NN model evaluation, the processor evaluates the trained NN model using, for instance, evaluation data, which are separate from the training data but include input data and output data, similarly to the training data. More specifically, the processor inputs the input data of the evaluation data into the NN model, compares output data calculated therefrom with correct answer data (the output data) of the evaluation data, and determines whether or not the error therebetween is less than a predetermined reference value.

When the result of the NN model evaluation is unfavorable (NO in S5), the processor returns to initial adjustment S3 of the NN. Alternatively, in a case where data expansion is to be performed (YES in S6), the processor returns to data expansion S2. The processor then executes training S4 and evaluation S5 of the NN model again. When the result of the NN model evaluation is favorable (YES in S5), the processor terminates training of the NN model.

Figure 6:
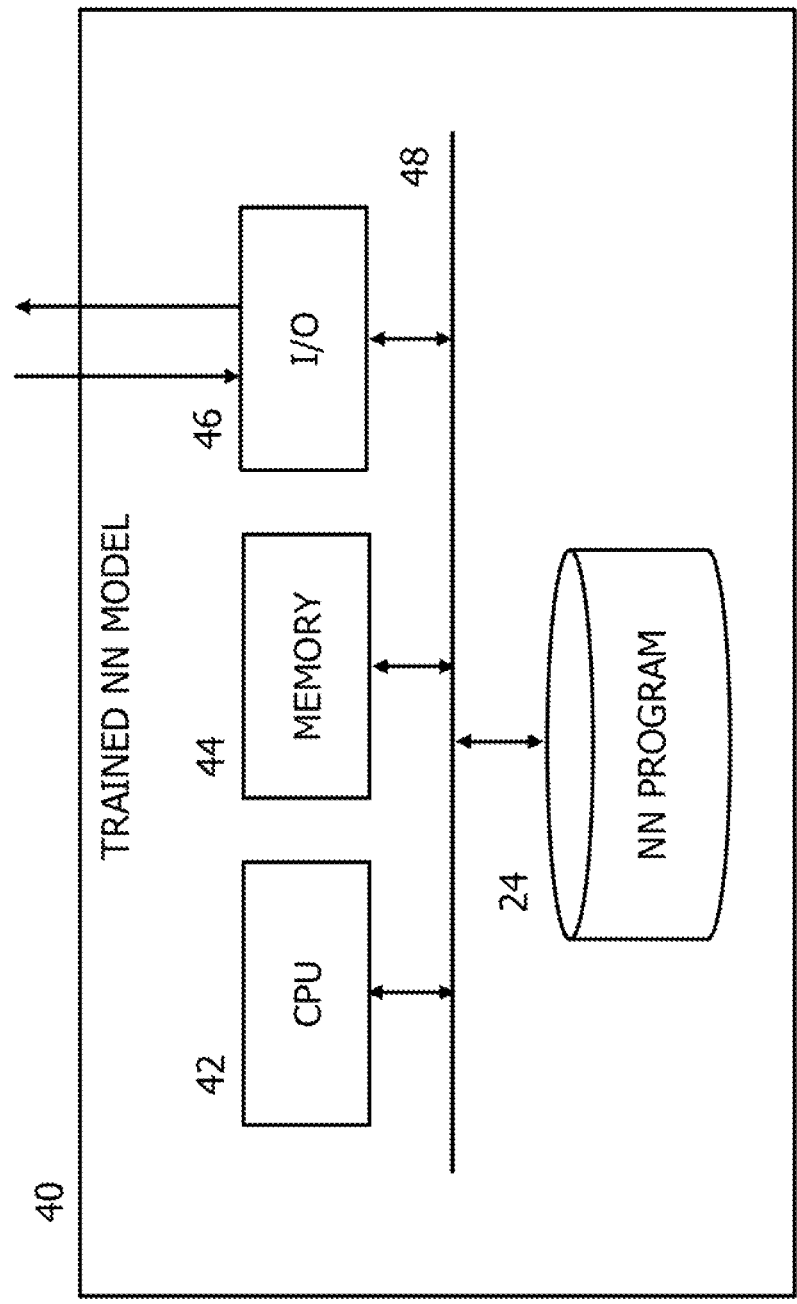
FIG. 6 is a view illustrating a configuration of a trained NN model.

FIG. 6 is a view illustrating a configuration of a trained NN model. The trained NN model is a model generated by the NN model training described above. As described above, when the NN model is trained using the training data, adjusted internal parameters, e.g., weights and biases, are generated. The adjusted internal parameters are included in the NN program 24 for executing arithmetic operations on the NN model.

An NN model 40 generated by training includes a processor 42, a memory 44 accessed by the processor, an input/output unit 46 which, at the time of inference (i.e., during an actual operation), receives input data as input and outputs output data of the NN model, a bus 48, and an auxiliary storage device for storing the NN program 24. When the processor 42 executes the NN program 24, the NN model 40 is realized to predict an output.

Figure 7:
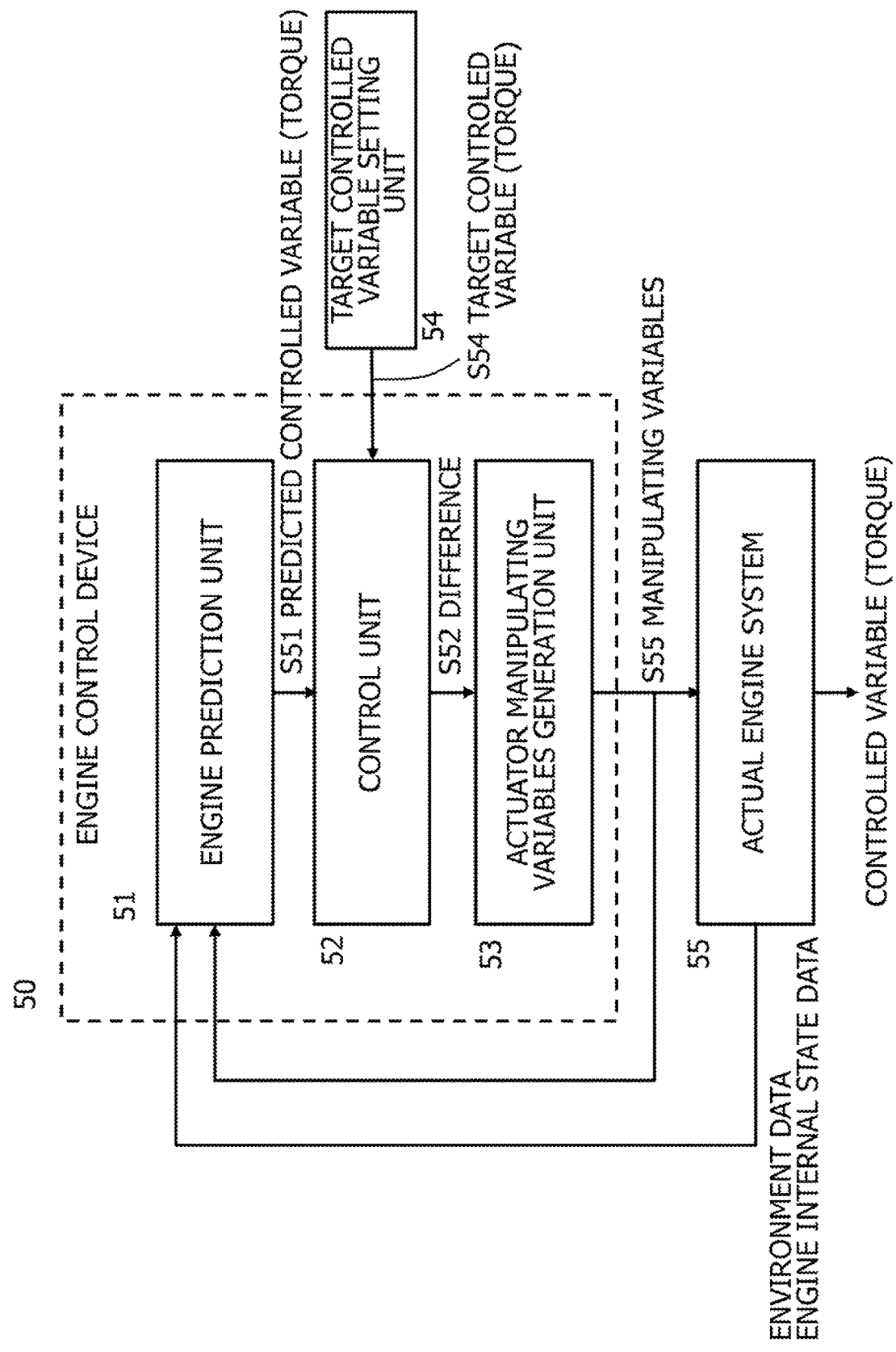
FIG. 7 is a view illustrating a configuration of an engine control device that uses a generated NN model.

FIG. 7 is a view illustrating a configuration of an engine control device that uses a generated NN model. An engine control device 50 includes an engine inference unit 51 constituted by an NN model, and a target controlled variable setting unit 54 for setting a torque S54 that is a target controlled variable based on manipulations of an accelerator pedal or the like by a driver. The engine control device 50 also includes a control unit 52 for calculating a difference S52 between a predicted torque S51 that is a predicted controlled variable output by the engine inference unit 51 and a target torque S54 that is a target controlled variable, and an actuator manipulating variable generation unit 53 for determining or generating a manipulating variable of an actuator provided in the engine based on the torque difference S52. The actuator operation amount generation unit 53 calculates how to vary which manipulating variable in order to eliminate the torque difference S52, and outputs a manipulation signal S55 corresponding to the varied manipulating variable S55 to an actual engine system 55. In response thereto, the actual engine system 55 outputs a torque that is the controlled variable.

The engine inference unit 51 is the trained NN model 40. Time series data of the manipulating variable output S55 to the actual engine system 55 are input into the NN model 40, and data indicating the internal state of the actual engine and environment data (temperature, pressure, and so on) may also be input into the NN model 40.

Torque, which is the controlled variable generated by the actual engine system 55, is difficult to detect using a sensor. In the engine control device, therefore, the NN model 40 is used as the engine inference unit 51, and the controlled variable (the torque) calculated by the NN model 40, which has been supplied with a manipulating variable S55 in an identical manner to the actual engine system 55, is predicted as the controlled variable (the torque) to be output by the actual engine system 55.

[Data Expansion Method]

Figure 8:
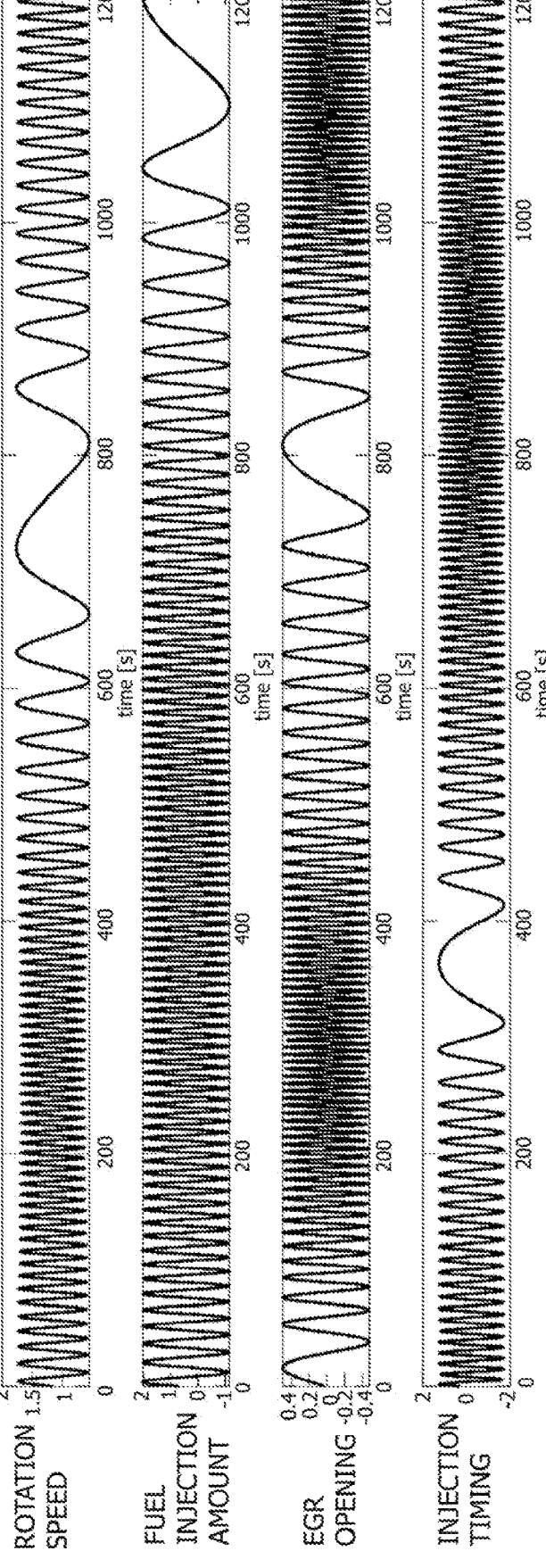
FIG. 8 is a view illustrating examples of the time series data of manipulating variables.

FIG. 8 is a view illustrating examples of the time series data of manipulating variables. The manipulating variables, for instance the engine rotation speed, the fuel injection amount, the EGR opening, and the injection timing, are constituted by chirp signals having a frequency component that varies over time, as illustrated in FIG. 8. The rotation speed, for instance, increases and decreases in the form of a sine wave, and the frequency of the sine wave varies over time. The other manipulating variables are identical.

Figure 9:
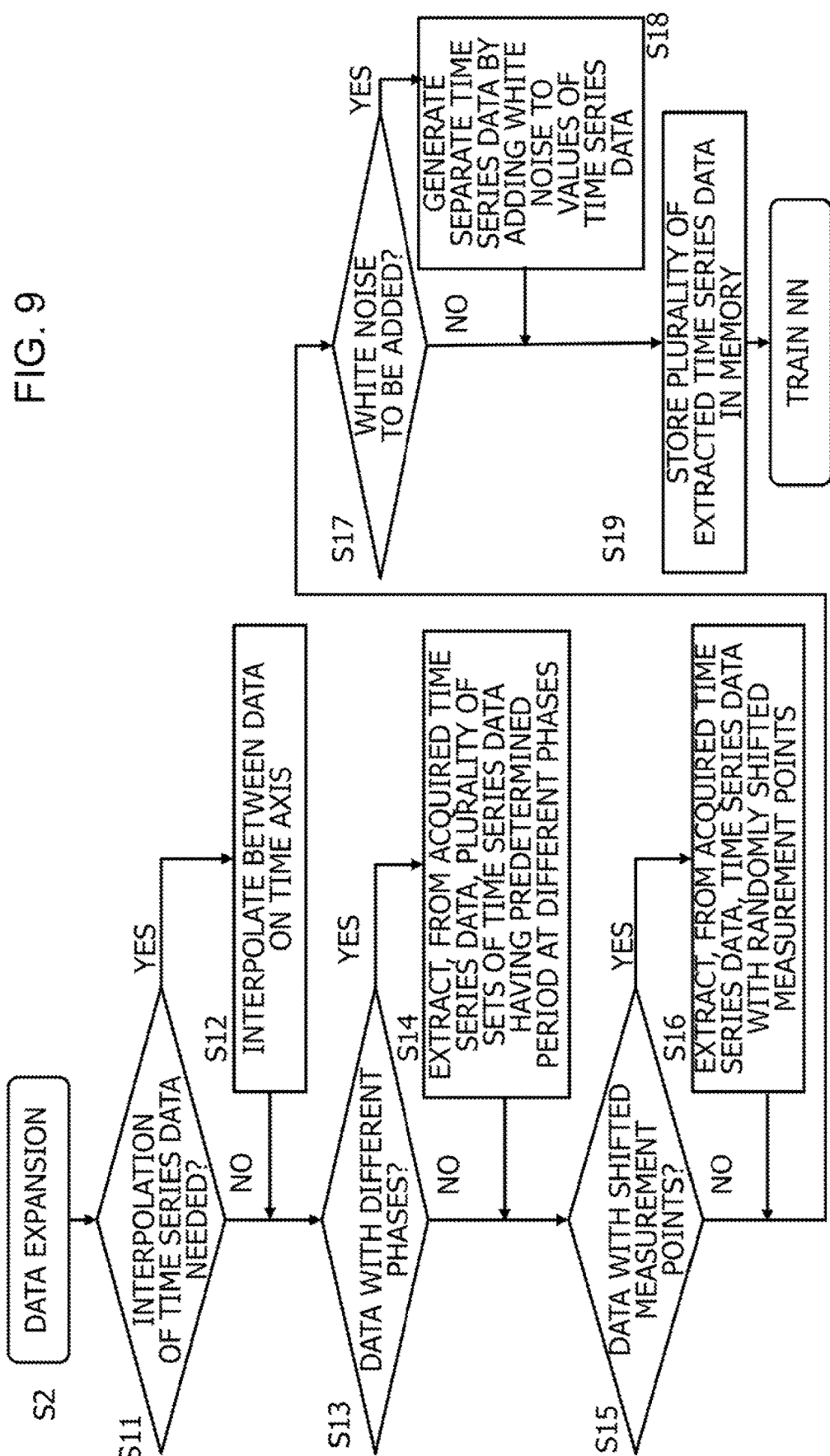
FIG. 9 is a view illustrating a flowchart of the data expansion S2 depicted on the training flowchart of FIG. 4.

FIG. 9 is a view illustrating a flowchart of the data expansion S2 depicted on the training flowchart of FIG. 4. Data expansion includes a plurality of data expansion processes, for instance (1) processing S11 and S12 for acquiring time series data having a period that is shorter than the operation period of the NN model by performing interpolation processing on time series data acquired from a real engine or the like, (2) processing S13 and S14 for increasing the amount of time series data by extracting a plurality of sets of time series data having a predetermined period from the short-period time series data at different phases, (3) processing S15 and S16 for increasing the amount of time series data by extracting time series data acquired by shifting the measurement points of the time series data randomly along the time axis, (4) processing S17 and S18 for generating separate time series data by adding white noise to the values of the time series data, and so on.

In the processing S11 and S12 of section (1) above, when the period of the time series data acquired from the actual engine or the like is equal to the operation period of the NN model (S11), data acquired by interpolation are added thereto so as to acquire time series data having a period that is shorter than the operation period of the NN model (S12).

Figure 10:
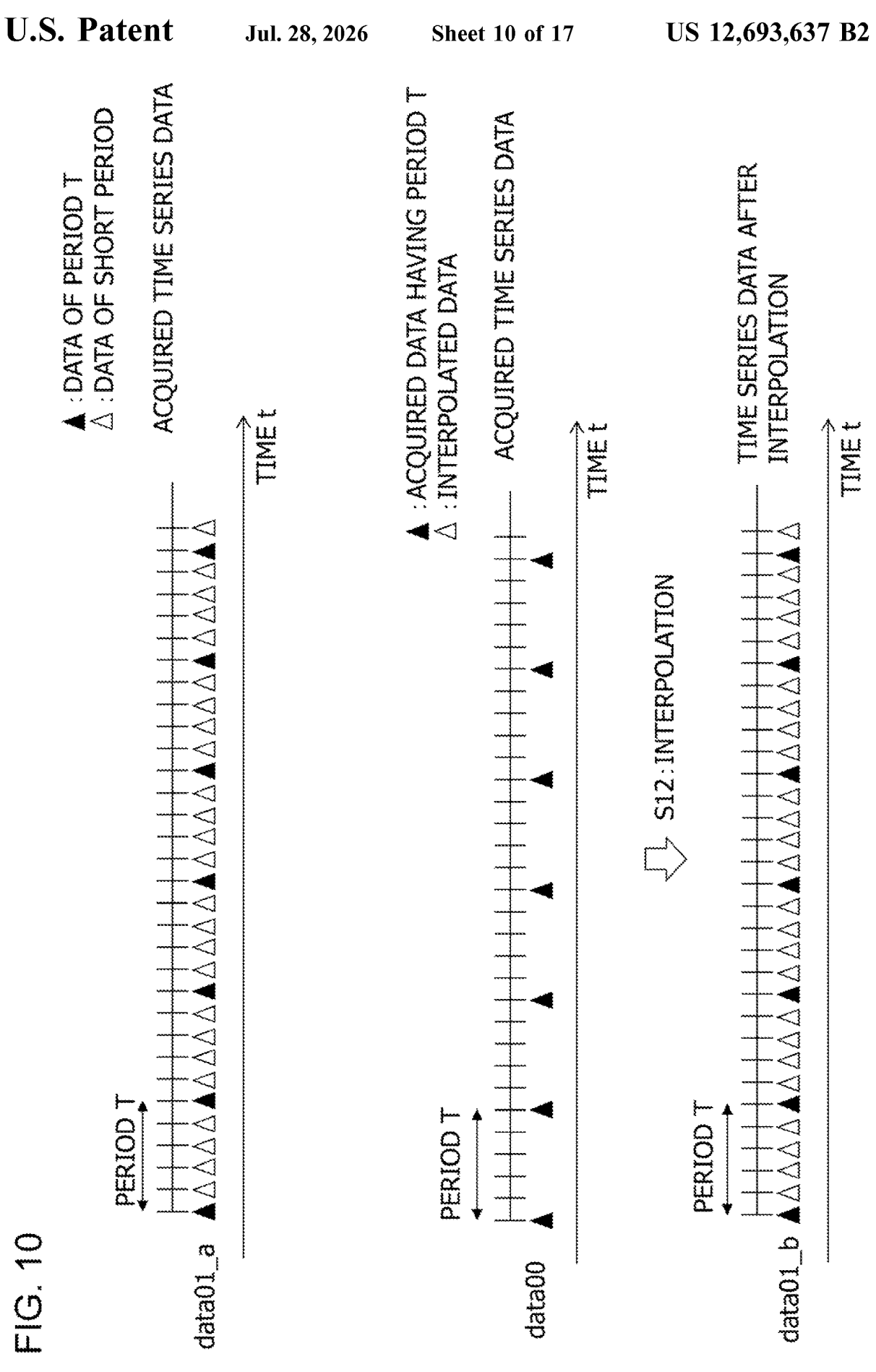
FIG. 10 is a view illustrating time series data of a shorter period than the operation period of the NN model and short-period time series data generated by interpolation processing.

FIG. 10 is a view illustrating time series data having a shorter period than the operation period of the NN model and short-period time series data generated by interpolation processing. In FIG. 10, the timings of the time series data are indicated by triangles, while the values of the time series data are not depicted.

Acquired time series data data01_a are time series data having a shorter period than an operation period T, and include data of the operation period T of the NN model and data having a shorter period than the operation period T. When it is possible to acquire the time series data data01_a from the actual engine or the like, the interpolation processing does not have to be performed (NO in S11).

Acquired time series data data00, meanwhile, are data having the operation period T of the NN model. In this case, the interpolation processing is to be performed (YES in S11), and therefore the processor generates interpolated time series data data01_b by generating interpolated data (data acquired at timings indicated by white triangles in the figure) in the time axis direction between the data (data acquired at timings indicated by black triangles in the figure) of the period T, which constitute the acquired time series data data00, and adding the interpolated data thereto. The interpolated time series data data01_b include data having a period that is shorter than the operation period T of the NN model.

Figure 11:
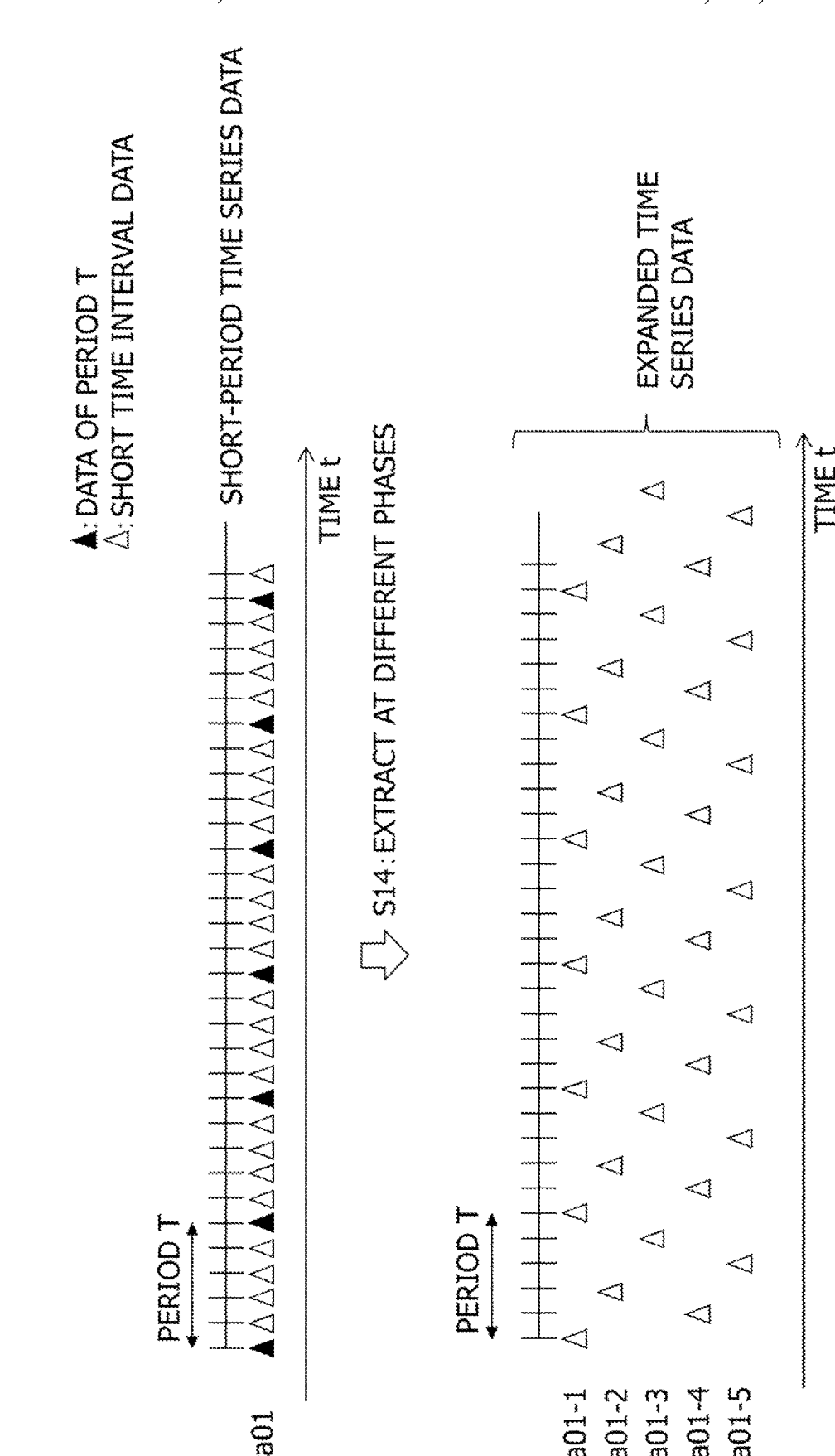
FIG. 11 is a view illustrating expanded time series data extracted from the short-period time series data at different phases.

FIG. 11 is a view illustrating expanded time series data extracted from the short-period time series data at different phases. Next, when data expansion is to be performed by extracting data at different phases (YES in S13), the processor generates a plurality of sets of expanded time series data by extracting a plurality of sets of time series data data01_1 to data01_5 having a predetermined period at different phases from time series data data01 having a shorter period than the operation period T of the NN model (S14).

The short-period time series data data01 are identical to the time series data data01_a and data01_b of FIG. 10 and include data (the black triangles) acquired at timings corresponding to the operation period T of the NN model and short-period data (the white triangles) acquired between the data having the operation period T of the NN model. On the other hand, the expanded time series data data01_1 to data01_5 are time series data acquired by extracting data having a predetermined period from the short-period time series data data01 at shifted phases. In the example of FIG. 11, the expanded time series data are data of the same period as the operation period T of the NN model. In this embodiment, although the predetermined period of the expanded time series data does not necessarily have to be the same as the operation period T, the predetermined period is at least longer than the period of the short-period time series data data01.

Figure 12:
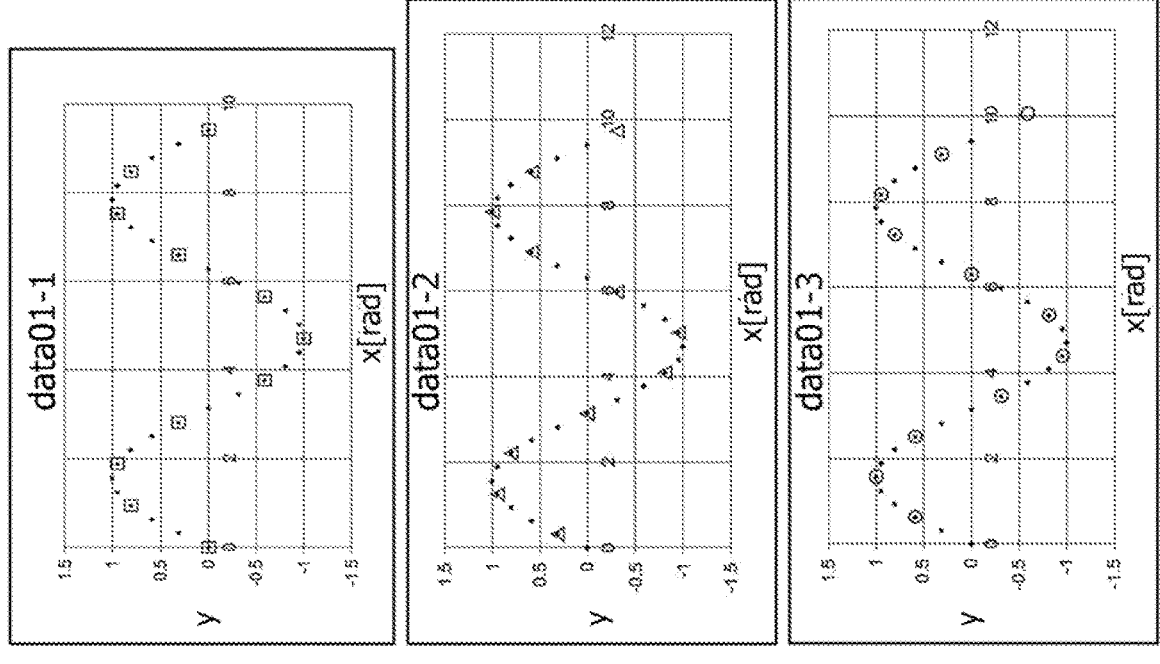
FIG. 12 is a view illustrating specific examples of expanded time series data extracted at different phases.
Figure 12:
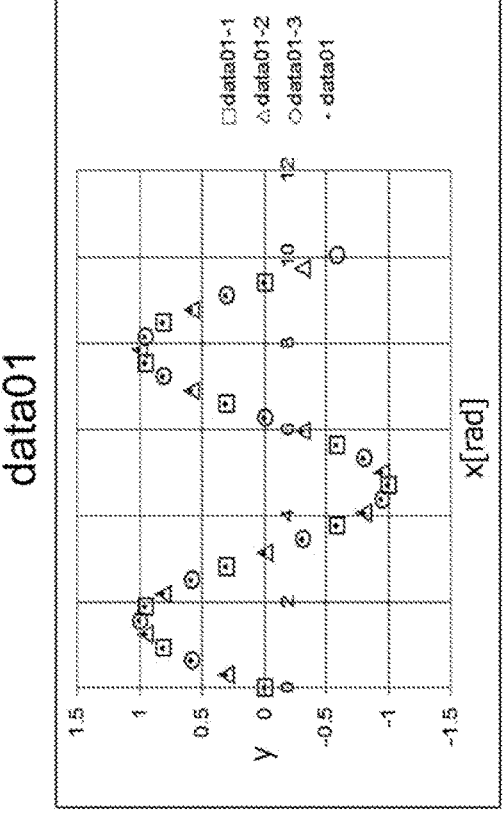

FIG. 12 is a view illustrating specific examples of expanded time series data extracted at different phases. FIG. 12 depicts expanded time series data data01_1, data01_2, and data01_3 having the same period as the operation period T of the NN model, which have been extracted at respectively shifted phases from the data at the sample timings of the short-period time series data data01. The short-period time series data data01 are sine-wave time series data.

The expanded time series data data01_1 are generated by extracting data at sample timings indicated by squares, the expanded time series data data01_2 are generated by extracting data at sample timings indicated by triangles, and the expanded time series data data01_3 are generated by extracting data at sample timings indicated by circles.

The time series data data01 are sine wave data, and therefore the expanded time series data data01_1 to data01_3 are time series data of the same period as the operation period T of the NN model but with respectively different data values. Hence, the expanded time series data exhibit a plurality of mutually different tendencies, and therefore a trained NN model that uses these expanded time series data as training data is a high generalization ability model in which bias is suppressed.

Figure 13:
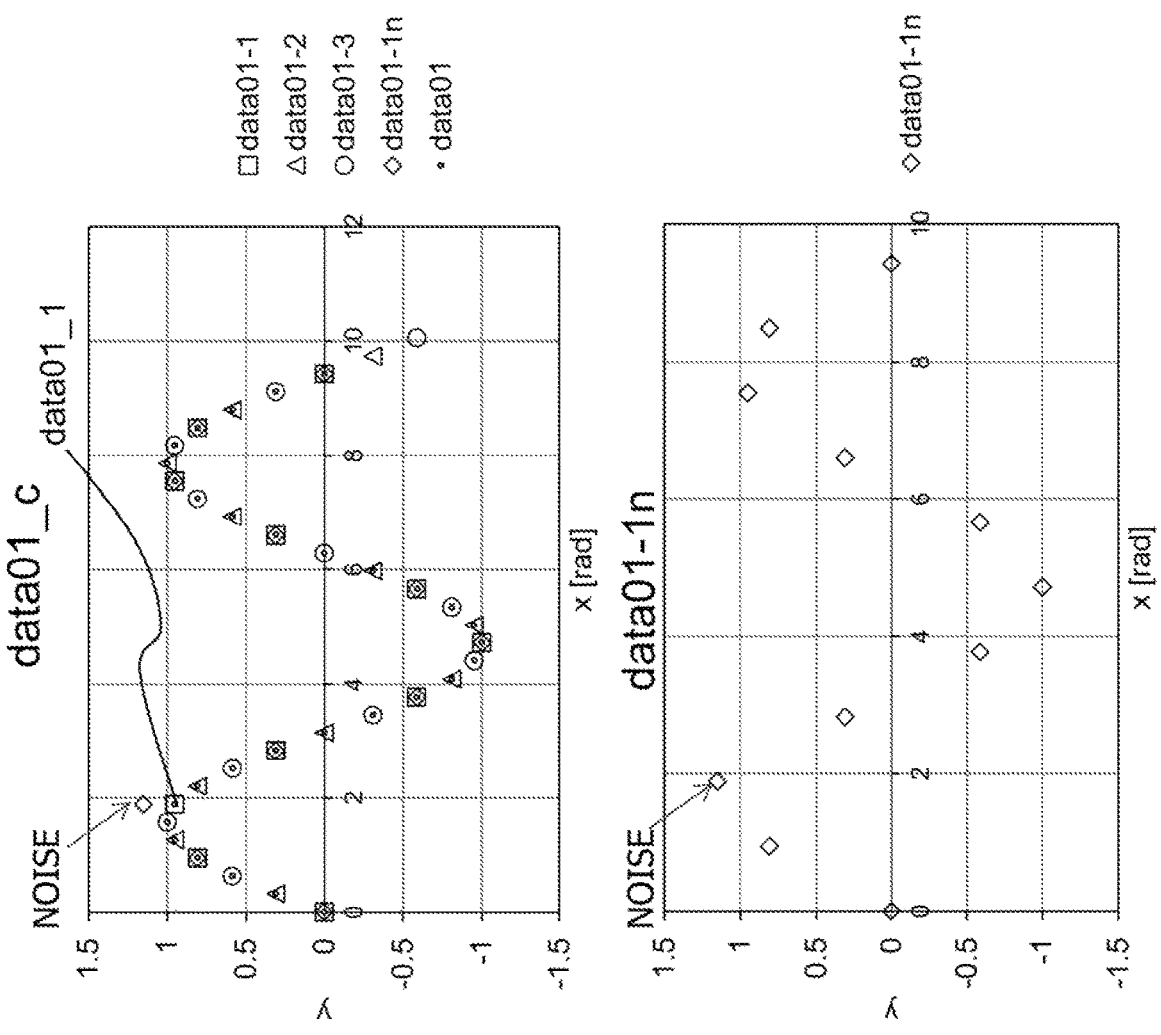

FIG. 13 is a view illustrating an example in which noise is generated in time series data acquired from a real engine or the like. In the figure, time series data data01_c represent an example in which noise indicated by rhomboid is generated at timings indicated by squares. This noise is sudden or periodic noise originating from the measurement environment when time series data are acquired from an actual engine or the like in an actual environment, for instance. Even when sudden or periodic noise is included, as in the acquired time series data data01_c, by extracting data of a predetermined period at different phases from the time series data data01_c so as to generate expanded time series data, it is possible to acquire expanded time series data (data01_2 and data01_3 in FIG. 12) not including the noise.

Hence, although data caused by noise are included in time series data data01_1n depicted in FIG. 13, among the expanded time series data, data caused by noise are not included in the time series data (data01_2 and data01_3 in FIG. 12) acquired at timings deviating from the timing of the noise. Therefore, when time series data acquired in a real environment include data caused by sudden or periodic noise, it can be suppressed that a situation in which the NN model is overtrained by being trained using the time series data data01_1n that includes the noise data.

Figure 14:
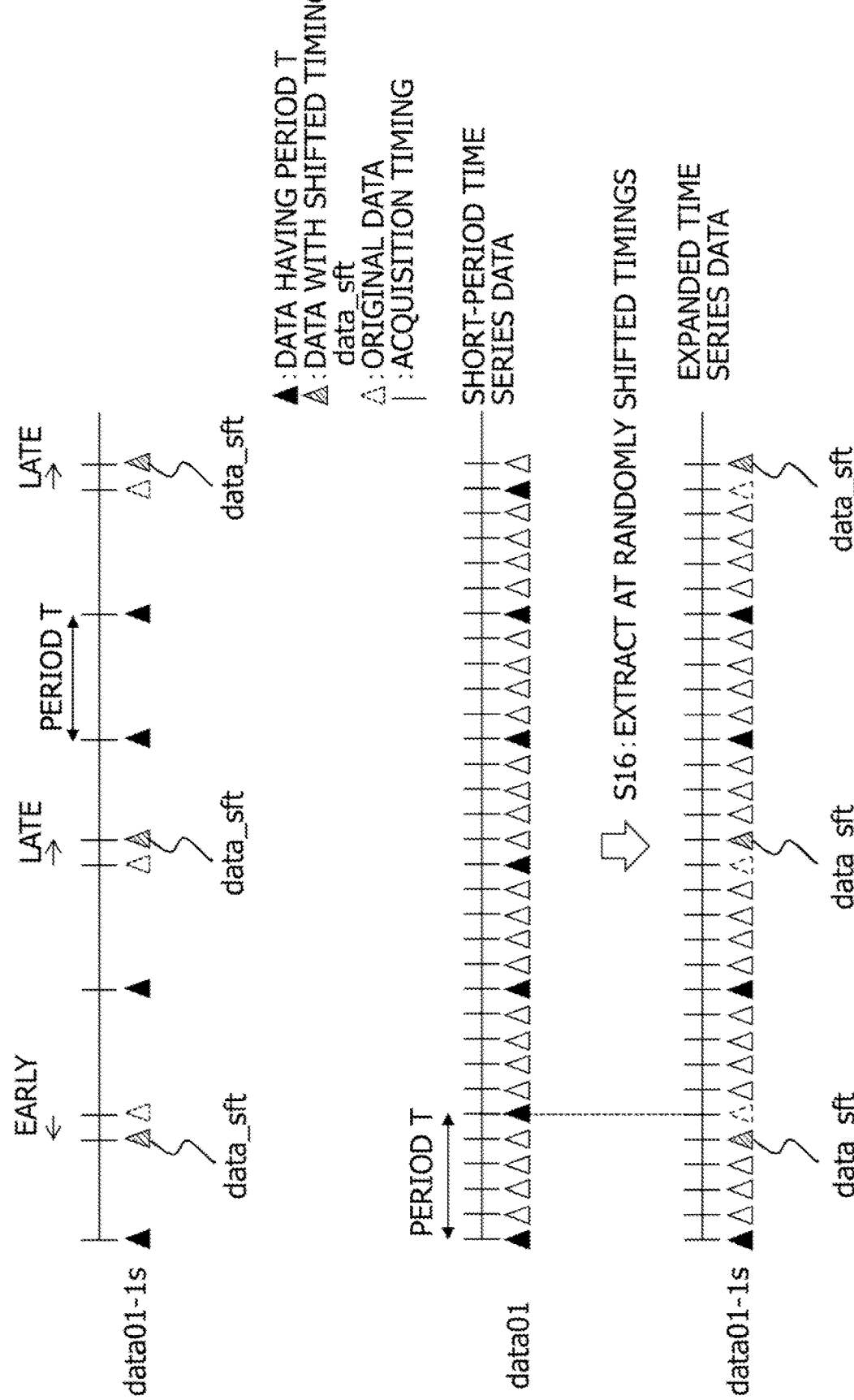
FIG. 14 is a view illustrating the extraction of time series data acquired by randomly shifting the timings of the measurement points from the time series data.

FIG. 14 is a view illustrating the extraction of time series data acquired by randomly shifting the timings of the measurement points from time series data. When time series data acquired by shifting the timings of the measurement points are to be generated (S15), the processor extracts, from the short-period time series data data01, data data_sft at timings randomly shifted earlier or later than the timings (the black triangles in the figure) of the predetermined period T along the time axis, and thereby acquires expanded time series data data01_1s (S16).

When training is performed using the time series data data01_1s, which include the data data_sft having the shifted extraction timings, as the training data, the trained NN model is a high generalization ability model that allows time series data having a shifted measurement timing, which may be generated in an actual environment. Hence, in addition to data expansion, it is possible to generate training data with which the generalization ability is increased.

Returning to FIG. 9, when time series data with added white noise are to be generated by data expansion (YES in S17), the processor generates separate time series data by adding white noise to the values of the time series data (S18). Finally, the processor stores the plurality of extracted time series data in the memory (S19).

Examples of the Embodiment

In a test conducted by the present inventors, a normal operating pattern of the Ministry of Transport and transient operation data were used as the training data of the NN model. The transient operation data were acquired by continuously varying operating conditions based on chirp signals being set upper and lower limits for each manipulating variable. Examples of the chirp signals are depicted in FIG. 8.

Figure 15:
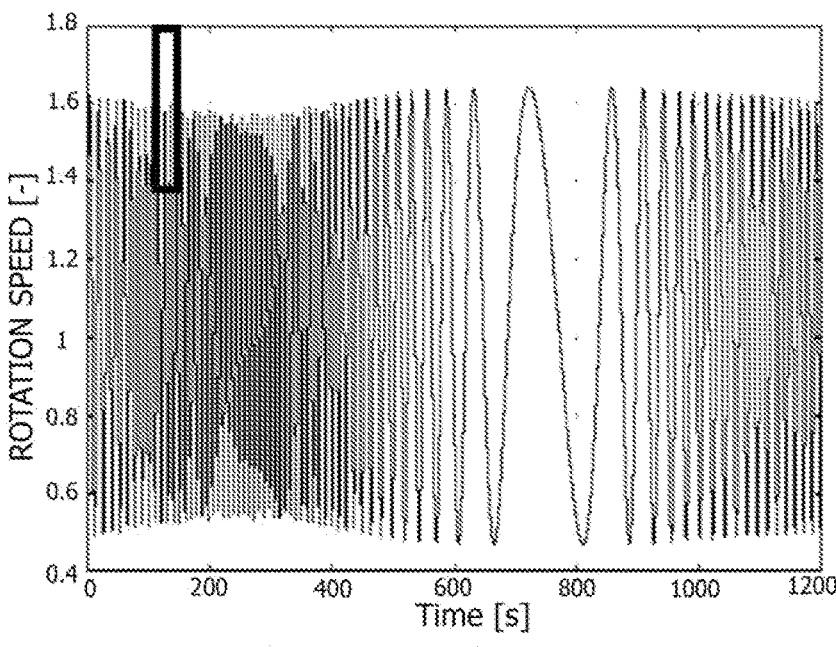
FIG. 15 is a view illustrating an example of time series data acquired in a real environment and expanded time series data extracted therefrom.
Figure 15:
Figure 15:
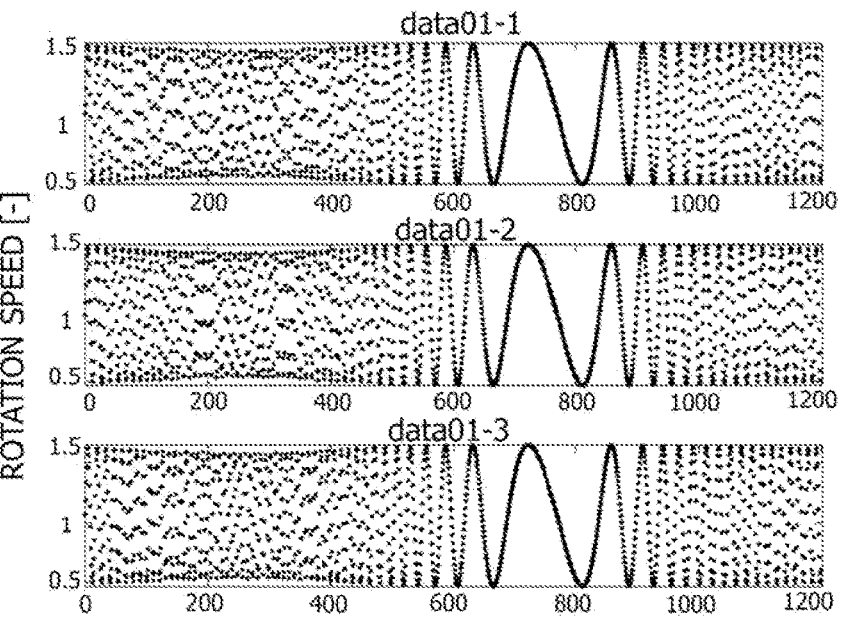

FIG. 15 is a view illustrating an example of time series data acquired in a real environment and expanded time series data extracted therefrom. In this example, the operation period of the NN model was 0.8 seconds, and the time series data data01 of the manipulating variables and the controlled variable were acquired at intervals of 0.08 seconds, i.e., a shorter period than the operation period of the NN model. Three sets of time series data data01_1 to data01_3 having the same period as the operation period of the NN model, i.e., 0.8 seconds, were extracted at phases acquired by shifting the extraction start time by 0.08 seconds, 0.32 seconds, and 0.64 seconds, respectively, from the acquired time series data data01 and these data were included in the training data.

In a comparative example, meanwhile, time series data extracted in a period of 0.8 seconds from an extraction start time of 0.08 seconds were used as the training data. Further, the time series data constituting the training data were acquired by operating a 3L series four-cylinder diesel engine on an engine bench.

Figure 16:
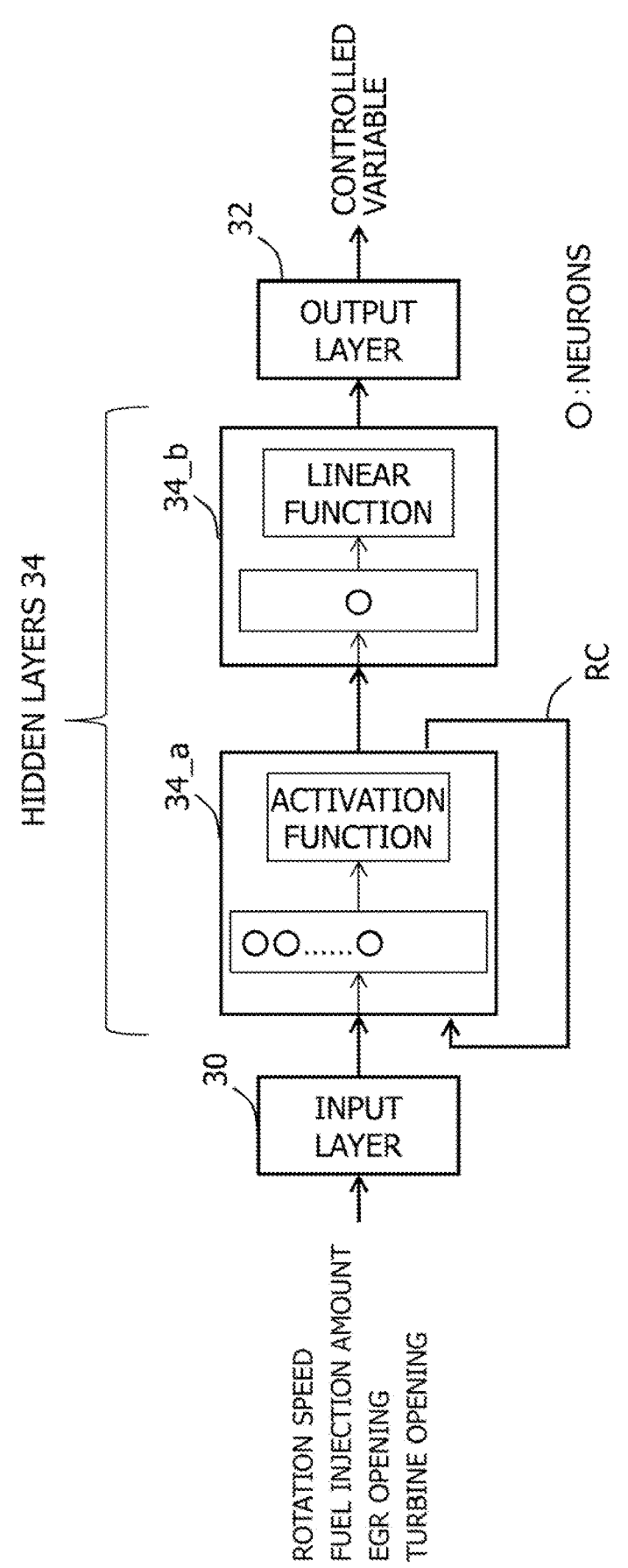
FIG. 16 is a view illustrating a configuration of the NN model used in the example and the comparative example.

FIG. 16 is a view illustrating a configuration of the NN model used in the example of the embodiment and the comparative example. The NN model includes an input layer 30, hidden layers 34_a and 34_b, and an output layer 32. Four controlled variables, namely the rotation speed, the fuel injection amount, the EGR opening, and the turbine opening, are input into the input layer, and a controlled variable, for instance an intake manifold pressure, is output from the output layer. The number of neurons in each of the hidden layers is 10, and an activation function and a linear function of the hidden layers are as illustrated.

Figure 17:
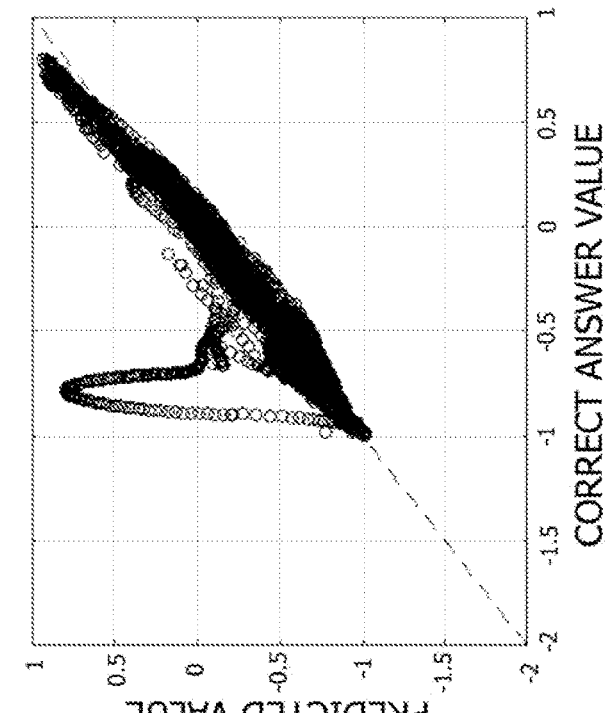
FIG. 17 is a view illustrating an example of cross-validation of the example and the comparative example.
Figure 17:
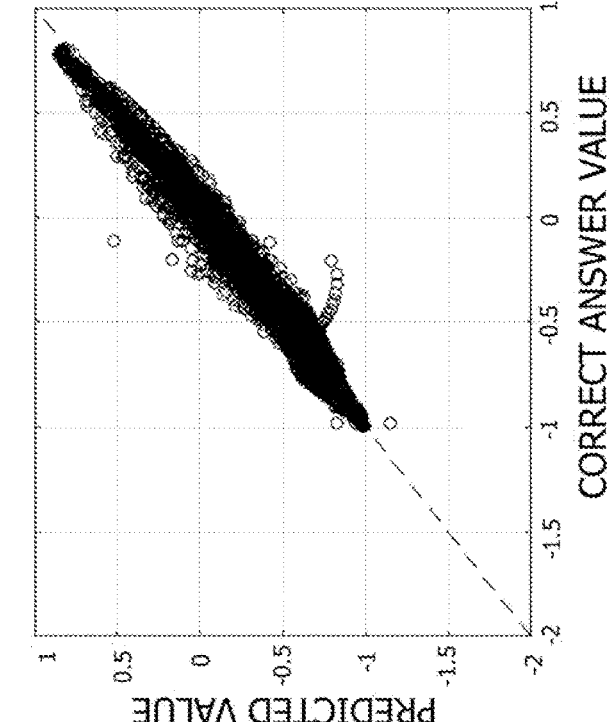

FIG. 17 is a view illustrating an example of cross-validation of the example of the embodiment and the comparative example. Cross-validation was performed on the trained NN models of the example of the embodiment and the comparative example using data acquired by operating an engine in an operation mode of the WHTC (World Harmonized Vehicle Cycle), whereupon the fitness, the RMSE (Root Mea Square Error), and $R^2$ were determined. It is able to be ascertained from the respective evaluation values illustrated in FIG. 17 that the fitness value, the RMSE, and $R^2$ of the example of the embodiment are all superior to those of the comparative example.

Outputs (predicted values) calculated by inputting into the NN model input values of data acquired from an engine operated in the operation mode of the WHTC and outputs (correct answer values) of the acquired data are plotted on the figures illustrating correct answer values and prediction values in FIG. 17. When the horizontal axis is set as x and the vertical axis is set as y, more data are plotted on the y=x axis in the example of the embodiment than in the comparative example, and this proves the superiority of the example.

According to this embodiment, as described above, short-period time series data having a period that is shorter than the operation period of the NN model are acquired. Then, the training data are expanded by adding a plurality of sets of time series data acquired by extracting data having a predetermined period from the short-period time series data at different phases, and time series data acquired by extracting, from the short-period time series data, data acquired at timings shifted randomly forward or backward along the time axis. Hence, time series data exhibiting various tendencies are able to be easily generated from the acquired time series data, and as a result, a great amount of training data is able to be generated. By training the NN model using these training data, it is possible to generate a high generalization ability NN model that is not overtrained.

According to the first aspect, the time series data included in the training data are able to be expanded easily.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1: Neural network model generation device
22: NN learning program
24: NN program
26: Training data
28: Time series data
data01: Short-period time series data
data01_1 to data01_3: Expanded time series data

The invention claimed is:

1. A method for generating a neural network model, the method comprising:
  wherein an engine control device includes:
    a processor, and
    an engine inference device constituted by the neural network model, wherein the processor executes a neural network program and causes the neural network model to input time series data of a manipulating variable, which is also input to an actual engine, and calculate time series data of a predicted controlled variable of the actual engine, and
    the engine control device calculates the manipulating variable based on the predicted controlled variable of the actual engine that is calculated by the neural network model,
  acquiring, by the processor, first time series data that includes time series data of the manipulating variable and the controlled variable being obtained from the actual engine during operation, the first time series data having a first period that is shorter than a calculation period of the neural network model when the processor executes the neural network program;
  extracting, by the processor, from the first time series data, a plurality of sets of second time series data having a second period that is longer than the first period, wherein the plurality of sets of second time series data includes the time series data of the manipulating variable and the controlled variable of the actual engine; and
  executing, by the processor, training of the neural network model using training data that include the plurality of sets of second time series data to update parameters of the neural network model so as to reduce difference between:
    the time series data of the predicted controlled variable of the actual engine that is calculated, based on the time series data of the manipulating variable in the training data, by the neural network model, and
    the time series data of the controlled variable of the actual engine in the training data.
2. The method for generating a neural network model according to claim 1, wherein, during the extraction process, a plurality of sets of second time series data having different phases are extracted from the first time series data.
3. The method for generating a neural network model according to claim 1, wherein, during the extraction process, data acquired at time points shifted forward or backward from a time point corresponding to the second period are extracted from the first time series data, such that a plurality of the second time series data having a third period that is shorter or longer than the second period and shorter than the first period are extracted.

4. The method for generating a neural network model according to claim 1, wherein the acquisition process includes:

acquiring third time series data having the calculation period of the neural network model from the actual engine during operation; and generating the first time series data by performing interpolation between data that are adjacent on a time axis of the third time series data so as to add a plurality of time series data between the data that are adjacent to the third time series data.

5. The method for generating a neural network model according to claim 1, further comprising:

evaluating the trained neural network model following the training process; and increasing the amount of the second time series data by executing the extraction process when an evaluation acquired during the evaluation process does not reach a reference level, wherein, during the training process, training of the neural network model is executed using training data including the increased second time series data.

6. The method for generating a neural network model according to claim 1, wherein the second period is the calculation period of the neural network model.

7. The method for generating a neural network model according to claim 6, wherein the time series data of the input are constituted by a chirp signal having a varying frequency.

8. The method for generating a neural network model according to claim 1, wherein the neural network model is a recurrent neural network.

9. An engine control device comprising:

a processor, and an engine inference device constituted by the neural network model, wherein the processor executes a neural network program and causes the neural network model to input time series data of a manipulating variable, which is also input to an actual engine, and calculate time series data of a predicted controlled variable of the actual engine, and the engine control device calculates the manipulating variable based on the predicted controlled variable of the actual engine that is calculated by the neural network model, wherein the neural network model is generated by the steps including:

acquiring, by the processor, first time series data that includes time series data of the manipulating variable and the controlled variable being obtained from the actual engine during operation, the first time series data having a first period that is shorter than a calculation period of the neural network model when the processor executes the neural network program;

extracting, by the processor, from the first time series data, a plurality of sets of second time series data having a second period that is longer than the first period, wherein the plurality of sets of second time series data includes the time series data of the manipulating variable and the controlled variable of the actual engine; and executing, by the processor, training of the neural network model using training data that include the plurality of sets of second time series data to update parameters of the neural network model so as to reduce difference between:

the time series data of the predicted controlled variable of the actual engine that is calculated, based on the time series data of the manipulating variable in the training data, by the neural network model, and the time series data of the controlled variable of the actual engine in the training data.

\* \* \* \* \*